(12) United States Patent
Sawano et al.

(10) Patent No.: US 9,568,353 B2
(45) Date of Patent: Feb. 14, 2017

(54) MEASUREMENT SYSTEM, MEASUREMENT METHOD OF MEASUREMENT DEVICE, MEASUREMENT DEVICE, AND NON-TRANSITORY STORAGE MEDIUM ENCODED WITH COMPUTER READABLE CONTROL PROGRAM, CAPABLE OF COMPLETING MEASUREMENT IN SIMPLE MANNER AND PROMPTLY

(71) Applicant: NINTENDO CO., LTD., Kyoto (JP)

(72) Inventors: Takao Sawano, Kyoto (JP); Hirohito Yoshimoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 549 days.

(21) Appl. No.: 14/074,367

(22) Filed: Nov. 7, 2013

(65) Prior Publication Data
US 2015/0046120 A1    Feb. 12, 2015

(30) Foreign Application Priority Data

Aug. 8, 2013 (JP) ................. 2013-165276

(51) Int. Cl.
*G01G 19/44* (2006.01)
*G01G 19/50* (2006.01)
*G01G 23/10* (2006.01)
*G01G 23/16* (2006.01)

(52) U.S. Cl.
CPC .............. *G01G 19/44* (2013.01); *G01G 19/50* (2013.01); *G01G 23/10* (2013.01); *G01G 23/16* (2013.01)

(58) Field of Classification Search
CPC ................ A61B 5/0537; A61B 5/4872; A61B 2560/0468; G01G 19/50; G01G 19/44; G01G 23/16; G01G 23/10

USPC .... 702/23, 101, 87, 173; 73/1.13; 177/25.13
See application file for complete search history.

(56) References Cited

U.S. PATENT DOCUMENTS

| | | | | |
|---|---|---|---|---|
| 3,986,012 A | * | 10/1976 | Loshbough | G01G 19/415 177/165 |
| 4,751,661 A | * | 6/1988 | Amacher | G01G 23/3707 177/3 |
| 4,923,024 A | * | 5/1990 | Ferrer | G01G 19/50 177/245 |
| 5,273,486 A | * | 12/1993 | Emmons | B64D 13/04 236/78 D |
| 5,832,417 A | * | 11/1998 | Petrucelli | G01G 23/01 177/25.13 |
| 7,596,453 B2 | * | 9/2009 | Sakai | G01G 23/10 702/173 |
| 8,341,701 B2 | * | 12/2012 | Ayaki | H04L 43/0864 713/168 |

(Continued)

FOREIGN PATENT DOCUMENTS

JP   5-18806   1/1993
JP   5-18807   1/1993

*Primary Examiner* — Carol S Tsai
(74) *Attorney, Agent, or Firm* — Nixon & Vanderhye, P.C.

(57) ABSTRACT

An exemplary embodiment provides a measurement system. A measurement system measuring body weight includes a weight detection unit detecting weight at predetermined detection cycles, and a calculating unit calculating an average value based on measurement values detected by the weight detection unit at the detection cycles. The detection cycle is shorter than a cycle at which a transient signal waveform predicted in accordance with measurement values detected by the weight detection unit can be obtained.

20 Claims, 11 Drawing Sheets

(56) References Cited

U.S. PATENT DOCUMENTS

| | | | | |
|---|---|---|---|---|
| 8,707,753 B2* | 4/2014 | Date | ............... | G01G 23/16 |
| | | | | 73/1.13 |
| 2006/0096789 A1* | 5/2006 | Kenmochi | ............ | A61B 5/0537 |
| | | | | 177/25.13 |
| 2008/0314648 A1* | 12/2008 | Suzuki | ................ | A61B 5/4872 |
| | | | | 177/25.13 |
| 2010/0130831 A1* | 5/2010 | Sato | ................ | G01G 23/3728 |
| | | | | 600/300 |
| 2011/0077536 A1* | 3/2011 | Kubo | ................ | A61B 5/022 |
| | | | | 600/499 |
| 2011/0226035 A1* | 9/2011 | Date | ............... | G01G 19/50 |
| | | | | 73/1.13 |
| 2014/0212850 A1* | 7/2014 | Shimizu | ................ | G01G 19/50 |
| | | | | 434/127 |
| 2014/0224552 A1* | 8/2014 | Shimizu | ................ | G01G 19/50 |
| | | | | 177/25.13 |

* cited by examiner

MEASUREMENT SYSTEM, MEASUREMENT METHOD OF MEASUREMENT DEVICE, MEASUREMENT DEVICE, AND NON-TRANSITORY STORAGE MEDIUM ENCODED WITH COMPUTER READABLE CONTROL PROGRAM, CAPABLE OF COMPLETING MEASUREMENT IN SIMPLE MANNER AND PROMPTLY

This nonprovisional application is based on Japanese Patent Application No. 2013-165276 filed with the Japan Patent Office on Aug. 8, 2013 the entire contents of which are hereby incorporated by reference.

FIELD

The present disclosure relates to a measurement system, a measurement method of a measurement system, a measurement device, and a non-transitory storage medium encoded with a computer readable control program.

BACKGROUND AND SUMMARY

Conventionally, various methods of measuring body weight have been proposed. On this point, with the conventional methods, a measured object was required to stand still for a predetermined period, for example, on a weighing machine or the like. In the case where the measured object did not stand still, the measurement could not be conducted, or an incorrect measurement value could be provided.

On this point, with regard to a method of measuring a domestic animal conventionally having been difficult to stand still, a method of measuring body weight has been proposed. According to the proposed method, measurement values are analyzed which are acquired between placement of a measured object to a measurement position where measurement can be conducted and termination of measurement after the measured object moves from the measurement position, and then a group of stable measurement values is selected from the acquired measurement values.

However, according to the method described above, since it is necessary to acquire all of measurement values up to termination of the measurement, it disadvantageously takes a long time to complete measurement.

An object of the present disclosure is to solve the problem described above, and to provide a measurement system, a measurement method of a measurement device, a measurement device, and a non-transitory storage medium encoded with a computer readable control program control program, capable of completing measurement in a simple manner and promptly.

An exemplary embodiment provides a measurement system measuring body weight. The measurement system includes a weight detection unit detecting weight at predetermined detection cycles, and a calculating unit calculating an average value based on measurement values detected at the detection cycles by the weight detection unit. The detection cycle is shorter than a cycle at which a transient signal waveform predicted in accordance with measurement values detected by the weight detection unit can be obtained.

In the exemplary embodiment, the calculating unit calculates an average value based on measurement values detected by the weight detection unit during a predetermined interval.

In the exemplary embodiment, the calculating unit determines whether or not measurement values detected by the weight detection unit satisfy a predetermined condition, and the calculating unit calculates the average value based on measurement values for the predetermined interval when determined that the predetermined condition is satisfied.

In the exemplary embodiment, the calculating unit determines whether or not the measurement values detected by the weight detection unit for a predetermined period satisfy a predetermined condition, and the predetermined interval includes the predetermined period determined that the predetermined condition is satisfied.

In the exemplary embodiment, the predetermined interval corresponds to a period subsequent to the determination that the predetermined condition is satisfied.

In the exemplary embodiment, the calculating unit determines whether or not the measurement values detected by the weight detection unit is in a stable state, and the calculating unit calculates the average value based on the measurement values for the predetermined interval when determined that detected measurement values are in the stable state.

In the exemplary embodiment, the calculating unit determines whether or not a difference between a maximum value and a minimum value of the measurement values detected by the weight detection unit for a predetermined period falls within a predetermined range, and the calculating unit calculates the average value based on the measurement values for the predetermined interval when determined that the difference falls within the predetermined range.

In the exemplary embodiment, the calculating unit determines whether or not a difference between a maximum value and a current value of measurement values detected by the weight detection unit for a predetermined period falls within a predetermined range, and the calculating unit calculates the average value based on measurement values for the predetermined interval when determined that the difference falls within the predetermined range.

In the exemplary embodiment, the calculating unit determines whether or not a predetermined period has passed after the measurement values are detected by the weight detection unit, and the calculating unit calculates the average value based on the measurement values for the predetermined interval when determined that the predetermined period has passed.

In the exemplary embodiment, the calculating unit calculates the average value based on the measurement values detected by the weight detection unit, excluding a value deviating from a predetermined range.

In the exemplary embodiment, the calculating unit excludes the value deviating from the predetermined range based on distribution of the measurement values detected by the weight detection unit.

In the exemplary embodiment, the calculating unit calculates deviation values of the measurement values detected by the weight detection unit, and calculates the average value based on the measurement values detected by the weight detection unit, excluding the measurement values having calculated deviation values deviating from the predetermined range.

In the exemplary embodiment, the calculating unit determines whether or not a measurement value detected by the weight detection unit is less than or equal to a predetermined value, and the calculating unit terminates calculation of the average value when determined that the measurement value is less than or equal to the predetermined value.

In the exemplary embodiment, the detection cycle is substantially less than or equal to 100 ms.

An exemplary embodiment provides a measurement method of a measurement device measuring body weight.

The measurement method includes the steps of detecting weight at predetermined detection cycles and calculating an average value based on measurement values detected at the detection cycles. The detection cycle is shorter than a cycle at which a transient signal waveform predicted in accordance with detected measurement values can be obtained.

An exemplary embodiment provides a measurement device measuring body weight. The measurement device includes a weight detection unit detecting weight at predetermined detection cycles, and a calculating unit calculating an average value based on measurement values detected by the weight detection unit at the detection cycles. The detection cycle is shorter than a cycle at which a transient signal waveform predicted in accordance with measurement values detected by the weight detection unit can be obtained.

An exemplary embodiment provides a non-transitory storage medium encoded with a computer readable control program executable by a computer of a measurement device measuring body weight. The control program controls the computer to serve as a module detecting weight at predetermined detection cycles and a module calculating an average value based on measurement values detected at the detection cycles. The detection cycle is shorter than a cycle at which a transient signal waveform predicted in accordance with detected measurement values can be obtained.

According to the exemplary embodiment, measurement can be completed in a simple manner and promptly.

The foregoing and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

Figure 1:
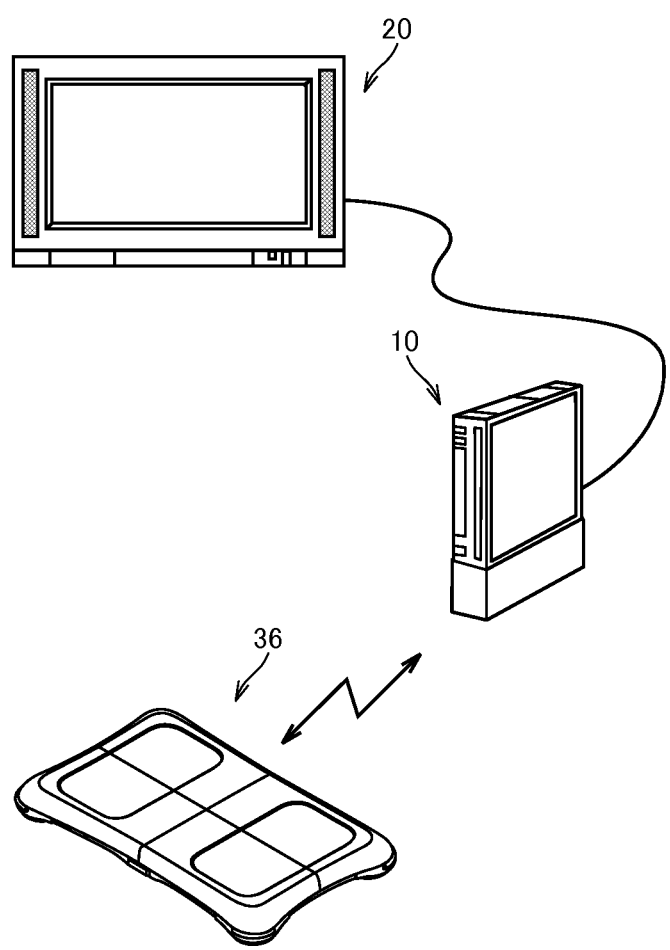
FIG. 1 shows an exemplary illustrative non-limiting schematic view representing a configuration of a measurement system according to an exemplary embodiment.

Hereinafter, description will be made with reference to the drawings. In the following description, the parts having the same function and effect have the same reference numerals allotted throughout the drawings, and description thereof will not be repeated.

<Configuration of Measurement System>

In the present example, an example using an information processing device will be described as one example of a measurement system.

FIG. 1 schematically represents a configuration of a measurement system based on the present embodiment.

Referring to FIG. 1, the measurement system based on the present embodiment includes an information processing device 10, a display 20, and a weight detection unit 36.

The weight detection unit is provided so as to be communicable with information processing device 10 and detects weight.

Information processing device 10 measures body weight based on data from weight detection unit 36 and outputs a measurement result to display 20.

Display 20 can employ a liquid crystal display (LCD) as one example.

In the present example, description will be made as to the case where display 20 and information processing device 10 are separate bodies. However, not limited to this configuration, the configuration of providing display 20 and information processing device 10 as an integrated device may be employed.

Figure 2:
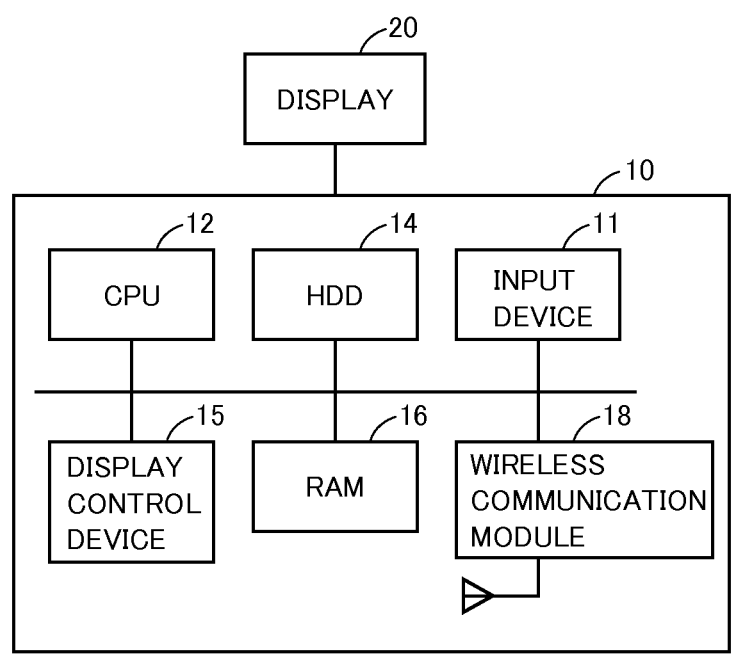
FIG. 2 shows the exemplary illustrative non-limiting functional block diagram representing an information processing device according to the exemplary embodiment.

FIG. 2 represents a functional block diagram of the information processing device based on the present embodiment.

Referring to FIG. 2, information processing device 10 includes an input device 11, a CPU (Central Processing Unit) 12, an HDD (Hard Disk Drive) 14, a display control device 15, an RAM (Random Access Memory) 16, and a wireless communication module 18.

Input device 11 is operated by a user of information processing device 10 and outputs signals corresponding to operation of the user to CPU 12. Input device 11 is a remote controller, a touch panel, or the like, not illustrated in the drawings, provided so that a user can remotely operate information processing device 10.

Display control device 15 generates an image to be displayed on display 20 and outputs the image to display 20 to display the image.

CPU 12 is calculating means executing a computer program.

HDD 14 stores a computer program to be executed by CPU 12. The computer program to be executed by CPU 12 may be recorded in advance or may be acquired from other equipment through communication with the equipment. Further, not limited to HDD 14, an ROM (Read Only Memory) may be provided, or the configuration provided with a reading device reading the computer program recorded in a recording medium such as an optical disk may be employed.

RAM 16 temporarily stores a computer program and information. PSRAM (Pseudo-SRAM) can be employed as one example of RAM 16.

Wireless communication module 18 transmits signals to weight detection unit 36 and receives signals from the weight detection unit through wireless communication.

<Weight Detection Unit>

Figure 3:
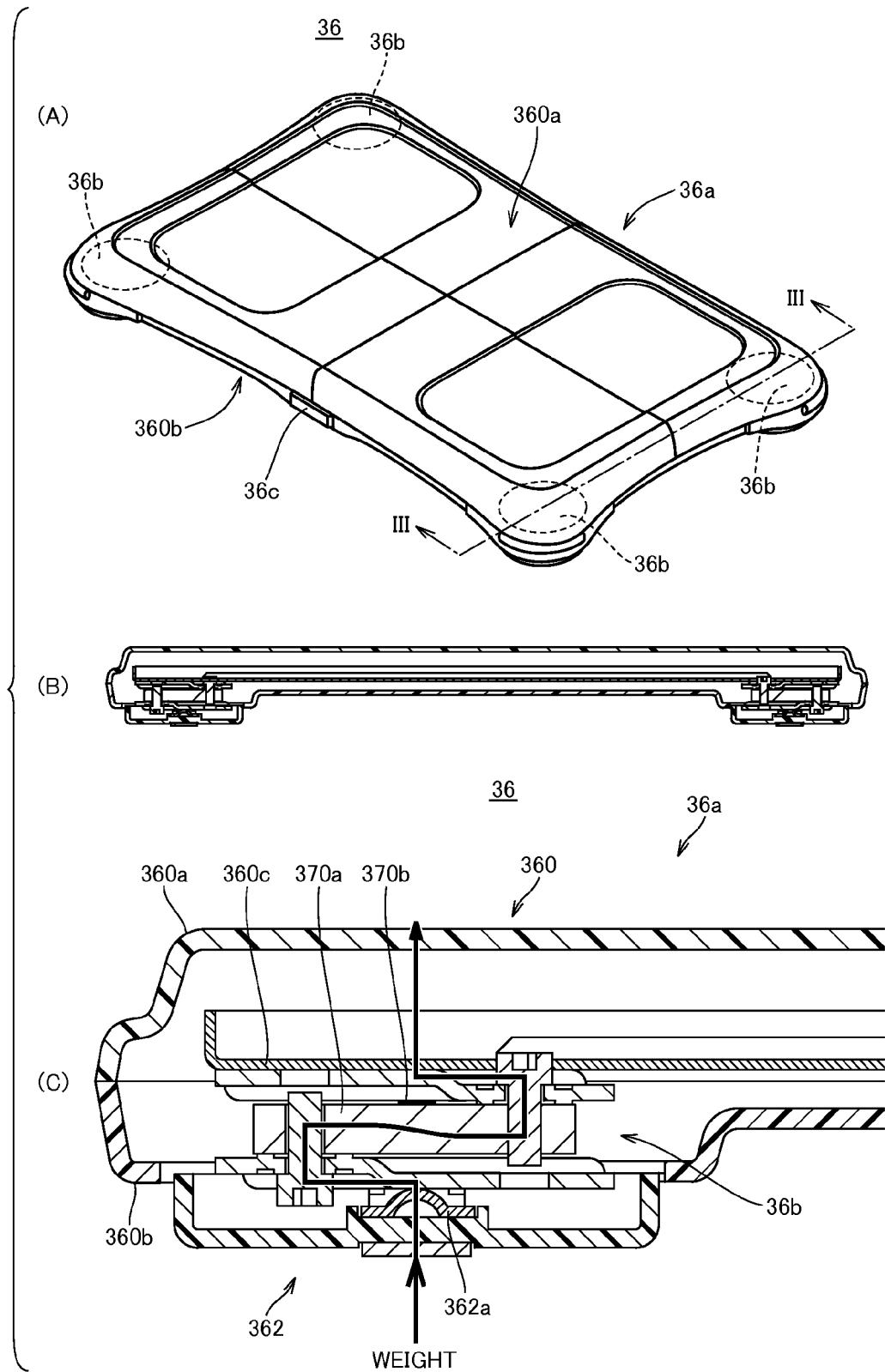
FIG. 3 shows the exemplary illustrative non-limiting view representing a weight detection unit shown in FIG. 1 according to the exemplary embodiment.

FIG. 3 represents weight detection unit 36 shown in FIG. 1 based on the present embodiment.

FIG. 3(A) represents a perspective view showing external appearance of weight detection unit 36.

Referring to FIG. 3(A), weight detection unit 36 includes a stage 36a on which a measured person as a measured object stands (put feet of the measured person) and at least four weight sensors 36b detecting weight exerted on stage 36a. Each weight sensor 36b is provided in stage 36a, and arrangement thereof is illustrated with dotted lines in FIG. 3.

Stage 36a is formed to have an approximately cuboidal shape, and has an approximately rectangular shape in a top view. For example, each short side of the rectangle is set to have a length of about 30 cm, and each long side is set to have a length of about 50 cm. The upper surface of stage 36a on which the measured person stands is rendered planar. The side surfaces on four corners of stage 36a are formed so as to partially project to have a cylindrical shape.

In this stage 36a, four weight sensors 36b are arranged with predetermined spaces therebetween. In this example, four weight sensors 36b are arranged respectively in the peripheral edge portions of stage 36a, specifically at the four corners. The spaces between weight sensors 36b can be set to have appropriate values taking in consideration the way the measured object exerts weight on stage 36a.

Weight detection unit 36 is further provided with a power button 36c. When this power button 36c is turned on, power is supplied to each circuit component (refer to FIG. 4) of weight detection unit 36. However, there is a case where weight detection unit 36 is turned on in accordance with instructions from information processing device 10. Further, the power of weight detection unit 36 is turned off when no measured person stands thereon continuously for a certain time period (for example, 30 seconds) or longer. However, the power may be turned off when power button 36c is turned off in the state where weight detection unit 36 is activated.

FIG. 3 (B) represents a cross-sectional view of weight detection unit 36 taken along the III-III line.

FIG. 3(B) illustrates the cross section viewed from side.

FIG. 3(C) illustrates enlargement of the corner portion at which weight sensor 36b is arranged. As can be understood from the drawing, stage 36a includes a support plate 360 allowing a measured person to stand thereon and a leg 362.

Leg 362 is provided at a location where weight sensor 36b is arranged. In this example, since four weight sensors 36b are arranged at four corners, four legs 362 are provided at the four corners. Leg 362 is formed to have an approximately cylindrical shape with a bottom, for example, by plastic molding, and weight sensor 36b is arranged on a spherical part 362a provided at the bottom portion of leg 362. Support plate 360 is supported on leg 362 through weight sensor 36b.

Support plate 360 includes an upper layer plate 360a forming an upper surface and a side upper portion, a lower layer plate 360b forming a lower surface and a side lower portion, and a middle layer plate 360c provided between upper layer plate 360a and lower layer plate 360b. Upper layer plate 360a and lower layer plate 360b are formed for instance by plastic molding and are integrated by means of adhesive or the like. Middle layer plate 360c is formed for instance by applying press molding to one metal plate. This middle layer plate 360c is fixed on four weight sensors 36b. Upper layer plate 360a has a grid-like rib (not illustrated) at its lower surface and is supported on middle layer plate 360c through the rib.

Thus, when a measured person stands on stage 36a, its weight is transmitted to support plate 360, weight sensors 36b, and legs 362. As illustrated in FIG. 3 with an arrow, reaction from the floor generated by the inputted weight is transmitted from legs 362 to upper layer plate 360a through spherical parts 362a, weight sensors 36b, and middle layer plate 360c.

Weight sensor 36b is for instance a flexure gauge (flexure sensor) type load cell, and is a weight converter converting inputted weight into electric signals. In weight sensor 36b, flexure occurs due to deformation of flexure body 370a in accordance with input of weight. This flexure is converted into a change in electric resistance by flexure sensor 370b attached to the flexure body and then is further converted into a change in voltage. Thus, weight sensor 36b outputs a voltage signal indicating the inputted weight from an output terminal.

Weight sensor 36b may be a weight sensor of another type such as tuning fork vibration type, string vibration type, electrostatic capacity type, piezoelectric type, magnetic flexure type, or gyro type.

Figure 4:
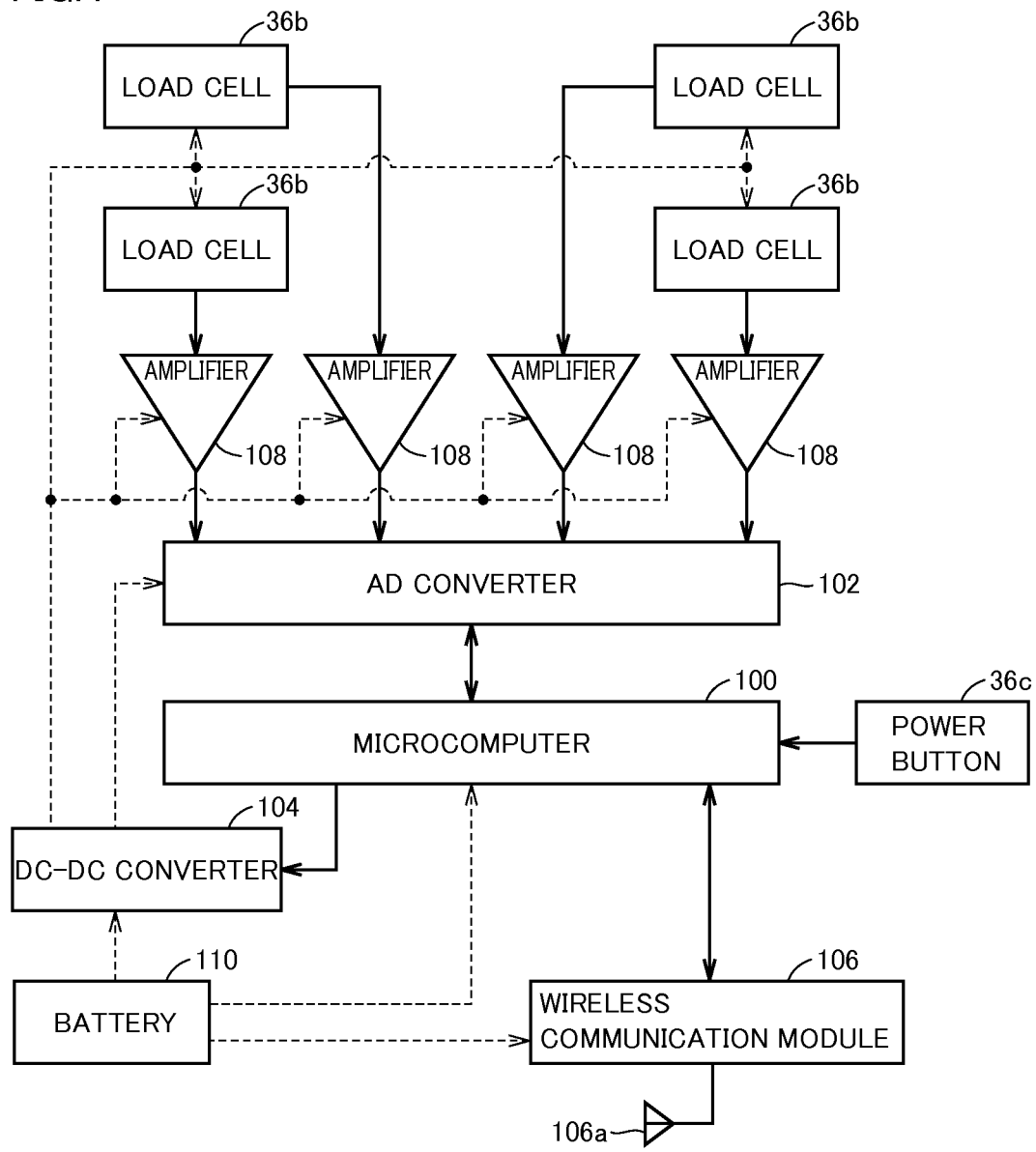
FIG. 4 shows the exemplary illustrative non-limiting block diagram representing an electric configuration of weight detection unit according to the exemplary embodiment.

FIG. 4 is a block diagram representing an electric configuration of weight detection unit 36 based on the present embodiment.

Referring to FIG. 4, in the present example, flows of signals and communication are indicated by solid-line arrows. The broken-line arrows indicate supply of power.

Weight detection unit 36 includes a microcomputer 100 controlling its operation. Microcomputer 100 includes a CPU, an ROM, an RAM, and the like not illustrated in the drawings, and the CPU controls operation of weight detection unit 36 in accordance with a program stored in the ROM.

Microcomputer 100 is connected with power button 36c, an AD converter 102, a DC-DC converter 104, and a wireless communication module 106. Further, wireless communication module 106 is connected with an antenna 106a. Further, four weight sensors 36b are illustrated as load cells 36b in FIG. 3. Four weight sensors 36b are connected to AD converter 102 through amplifiers 108 respectively.

Further, weight detection unit 36 accommodates a battery 110 for supply of power. In another example, an AC adapter may be connected in place of the battery to supply commercial power. In such a case, it is necessary to provide, in place of the DC-DC converter, a power supply circuit converting an alternate current into a direct current, and stepping down and rectifying direct-current voltage.

In this example, supply of power to microcomputer 100 and wireless communication module 106 is performed directly from the battery. In other words, power is always supplied to a component (CPU) as a part provided in microcomputer 100 and wireless communication module 106 to detect whether or not power button 36c is turned on, and whether or not a power-on (weight detection) command is transmitted from information processing device 10.

On the other hand, power from battery 110 is supplied to weight sensors 36b, AD converter 102, and amplifiers 108 through DC-DC converter 104. DC-DC converter 104 converts a voltage value of the direct current from battery 110 into a different voltage value and provides it to weight sensors 36b, AD converter 102, and amplifiers 108.

The supply of power to weight sensors 36b, AD converter 102, and amplifiers 108 may be performed as needed by control of DC-DC converter 104 by means of microcomputer 100. In other words, when determined that it is necessary to operate weight sensors 36b to detect weight, microcomputer 100 may control DC-DC converter 104 to supply power to each weight sensor 36b, AD converter 102, and each amplifier 108.

Upon the supply of power, each weight sensor 36b outputs signals indicating inputted weight. The signals are amplified by each amplifier 108, converted from analog signals into digital data by AD converter 102, and inputted to microcomputer 100. A detection value of each weight sensor 36b is provided with identification information of each weight sensor 36b, so that weight sensor 36b and corresponding detection value can be identified. In such a manner, microcomputer 100 can acquire data indicating respective weight detection values of four weight sensors 36b at the same time.

On the other hand, when determined that it is not necessary to operate weight sensors 36b, in other words, when it is not a weight detection timing, microcomputer 100 controls DC-DC converter 104 to stop supply of power to weight sensors 36b, AD converter 102, and amplifiers 108. As described above, in weight detection unit 36, since weight sensors 36b can be operated to perform detection of weight only when needed, power consumption for weight detection can be suppressed.

The case where the weight detection is necessary typically is the case where information processing device 10 (FIG. 1) needs to obtain weight data. For example, when information processing device 10 requires weight information, information processing device 10 transmits weight obtaining command to weight detection unit 36. When the weight obtaining command is received from information processing device 10, microcomputer 100 controls DC-DC converter 104 to supply power to weight sensors 36b or the like to detect weight.

On the other hand, when the weight obtaining command is not received from information processing device 10, microcomputer 100 controls DC-DC converter 104 to stop supply of power.

In the present example, microcomputer 100 determines weight detection timing at certain time intervals, and controls DC-DC converter 104. When performing such a cyclic weight detection, cycle information may be initially given to microcomputer 100 of weight detection unit 36 from information processing device 10 and stored, or may be stored in microcomputer 100 in advance.

Specifically, 60 times/second (60 Hz) is stored as cycle information of weight detection timing. In other words, the detection cycle is 1/60 sec.

The data indicating detection values from weight sensor 36b is transmitted as detection value data (measurement data) of weight detection unit 36 from microcomputer 100 to information processing device 10 (FIG. 1) through wireless communication module 106 and antenna 106a. For example, in the case where the weight detection is performed upon receiving a command from information processing device 10, when measurement data of weight sensors 36b is received from AD converter 102, microcomputer 100 transmits the measurement data to information processing device 10.

Alternatively, microcomputer 100 may transmit the measurement data to information processing device 10 at certain time intervals. In the case where the transmission cycle is longer than the weight detection cycle, measurement data including weight values at a plurality of detection timings detected up to the transmission timing are transmitted.

Wireless communication module 106 is set to be communicable using wireless communication standard (Bluetooth (registered trademark), wireless LAN, or the like) which is the same as that of wireless communication module 18 of information processing device 10.

Thus, CPU 12 of information processing device 10 can transmit weight obtaining commands to weight detection unit 36 through wireless communication module 18 or the like. Microcomputer 100 of weight detection unit 36 can receive commands from information processing device 10 through wireless communication module 106 and antenna 106a, and transmit measurement data including weight detection values of each weight sensor 36b to information processing device 10.

In the present example, the body weight is measured for instance based on a sum value of four weight detection values detected by four weight sensors 36b, as one example. In the present example, the sum value as a sum of the four weight detection values is transmitted as measurement data for instance to information processing device 10, as one example. Further, four weight detection values can be summed up at information processing device 10.

<Operation Flow>

Figure 5:
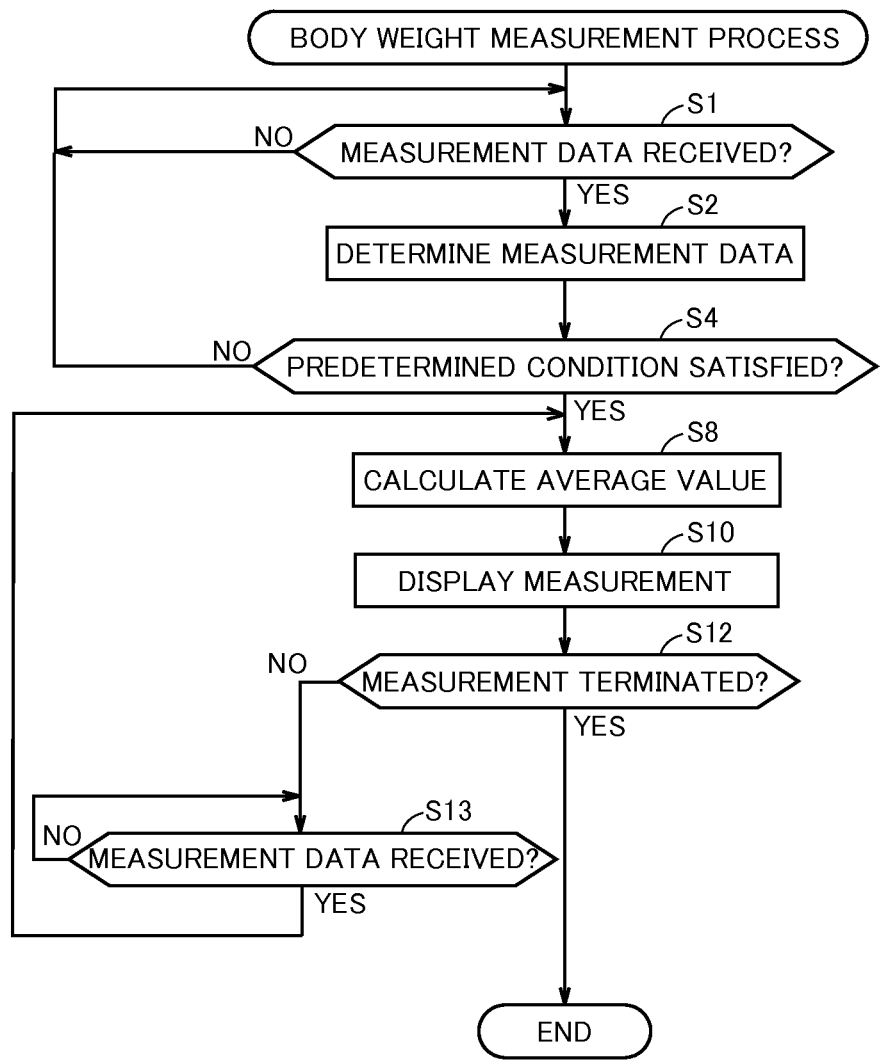
FIG. 5 shows the exemplary illustrative non-limiting diagram representing a flow of a body weight measurement process in an information processing device according to the exemplary embodiment.

FIG. 5 represents a flow of a body weight measurement process in information processing device 10 based on the present embodiment.

Referring to FIG. 5, information processing device 10 determines whether or not measurement data is received (step S1). On this point, wireless communication module 18 of information processing device 10 receives measurement data (weight detection values) from wireless communication module 106 of weight detection unit 36 at predetermined transmission cycles. In the present example, the transmission cycles and the detection cycles are assumed to be the same. In other words, measurement data (weight detection values) is transmitted to information processing device 10 at each time when the weight detection values are detected by weight sensors 36b in weight detection unit 36.

Next, when determined that measurement data is received (YES in step S1), information processing device 10 executes a determination process for the measurement data (step S2). Details about the determination process will be described later. Then, CPU 12 of information processing device 10 executes a determination process with respect to the received measurement data.

Next, information processing device 10 determines whether or not the predetermined condition is satisfied in accordance with the determination process (step S4).

Specifically, CPU 12 determines whether or not the predetermined condition is satisfied as a determination result of the determination process based on the received measurement data. The predetermined condition will be described later.

In step S4, when determined that the predetermined condition is satisfied (YES in step S4), information processing device 10 calculates an average value based on the measurement data (step S8). Specifically, CPU 12 calculates an average value based on measurement data (weight detection values) subsequent to satisfaction of the predetermined condition.

Next, information processing device 10 displays an average value as a calculation result (step S10). Specifically, CPU 12 controls display control device 15 to display an average value as the calculated body weight.

Next, information processing device 10 determines whether or not the measurement is terminated (step S12). The determination on whether or not the measurement is terminated will be described later.

In step S12, when determined that the measurement is terminated (YES in step S12), the process is terminated (END).

On the other hand, in step S4, when information processing device 10 determines that the predetermined condition is not satisfied (NO in step S4), the process returns to step S1. Further, in step S1, when the measurement data is not received (NO in step S1), the state of step S1 is maintained.

On the other hand, in step S12, when determined that the measurement is not terminated (NO in step S12), determination is made next on whether or not the measurement data is received (step S13).

Then, when determined that the measurement data is received (YES in step S13), information processing device 10 allows the process to return to step S8, and repeats the calculation process for an average value.

Since the subsequent processes are similar, detailed description thereof will not be repeated.

On the other hand, when determined that the measurement data is not received (NO in step S13), information processing device 10 maintains the state of step S13.

<Measurement Method>

Figure 6:
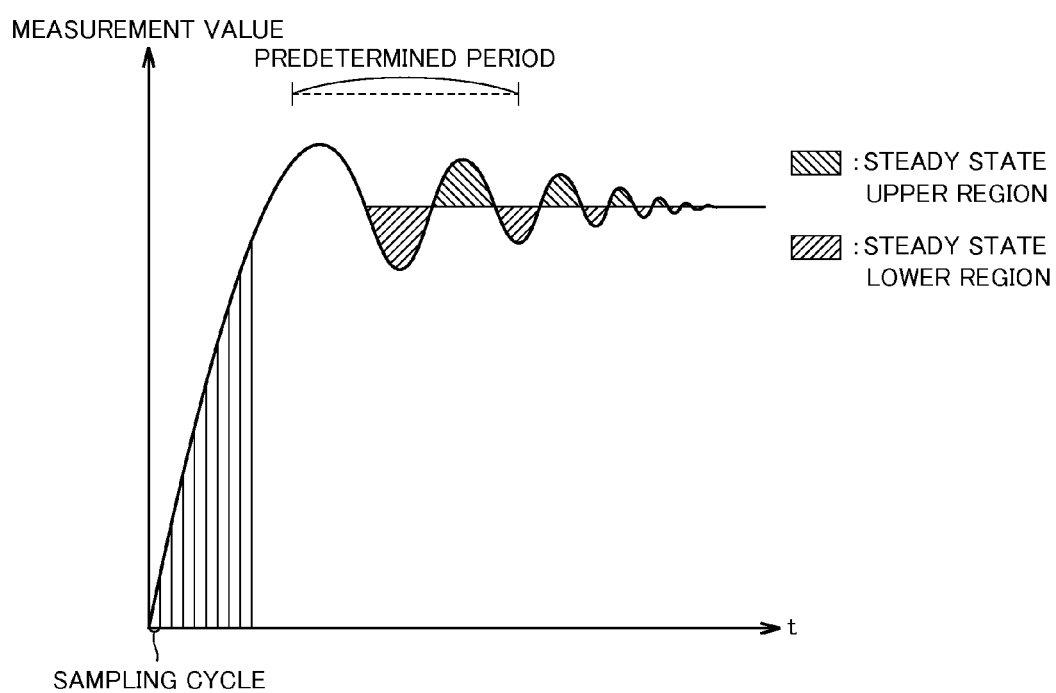
FIG. 6 shows the exemplary illustrative non-limiting graph representing measurement data according to the exemplary embodiment.

FIG. 6 represents measurement data based on the present embodiment.

Referring to FIG. 6, in the present example, a signal waveform sampled at predetermined detection cycles is presented.

The predetermined detection cycle in the present example is set to have a value shorter than a cycle at which a transient signal waveform predicted in accordance with measurement by weight detection unit 36 can be obtained. In other words, the detection cycle is set to be a detection cycle at which the transient signal waveform can be obtained, in other words, to be a sampling frequency. The detection cycle in the present example is set to be $\frac{1}{60}$ sec exhibiting a shorter detection cycle than that of general body weighing machines or the like.

With such setting, the transient signal waveform up to the transition to the steady state can be obtained in accordance with the weight detection in weight detection unit 36.

As described with reference to FIG. 3 above, a flexure body 370a is deformed to cause flexure in accordance with reaction from the floor generated due to weight (action) inputted with respect to weight detection unit 36, and weight detection values based on the change in electric resistance due to this flexure are detected. As a result of this action and reaction, vibration in the transient signal waveform is generated, and the signal is attenuated to transition to the steady state.

This vibration waveform is vibrated vertically with reference to a value of the final steady state. Therefore, the region (area) of the vibration in accordance with action and reaction becomes approximately equal.

Therefore, the body weight as a value of the final steady state can be measured by calculating an average value for a predetermined period based on the characteristics of the transient signal waveform.

Specifically, it is determined whether or not the transient signal waveform satisfies the predetermined condition by the determination process, and when determined that the predetermined condition is satisfied, an average value is calculated based on subsequent measurement values.

As the determination process in the present example, as one example, it is determined as the predetermined condition whether or not the measurement data received in the predetermined period is in the stable state. The stable state can be determined based on whether or not the vibration state of the transient signal waveform is attenuated. In the present example, as the predetermined period, it is determined whether or not the measurement data for about 0.5 seconds (corresponding to thirty sampling numbers in accordance with the predetermined cycle) prior to the currently received measurement data is in the stable state.

Then, when determined that it is in the stable state, an average value is calculated based on subsequent measurement data. As one example, when determined that it is in the stable state, an average value of the measurement data for the predetermined interval of about subsequent 0.5 seconds (corresponding to the thirty sampling numbers in accordance with the predetermined detection cycle) is calculated.

The case of calculating an average value of measurement data for the subsequent predetermined interval when determined that it is in the stable state is described. However, the average value of measurement data may be calculated by including the period determined as satisfying the predetermined condition in the predetermined interval. Including the determined period enables prompt calculation of an average value of the measurement data.

With this process, even when the signal waveform is in the vibration state, the average value is approximately constant, thus the body weight which is a value of the final steady state can be measured. Thus, a simple method of calculating the average value can be used to complete the measurement promptly.

In the description above, the case is described in which the predetermined period for determining the predetermined condition and a length of the predetermined interval for calculating an average value subsequent to the case where the predetermined condition is determined to be satisfied are about 0.5 seconds (corresponding to the thirty sampling numbers in accordance with the predetermined detection cycle). However, especially the value is one example, and a person skilled in the art can change the respective lengths to an appropriate length as needed taking in consideration the accuracy and the like. For example, after determined that the predetermined condition is satisfied, an average value may be calculated continuously without limiting the predetermined interval. Further, the period determined as satisfying the predetermined condition may be included in the predetermined interval to continuously calculate the average value.

(Determination Process 1)

Figure 7:
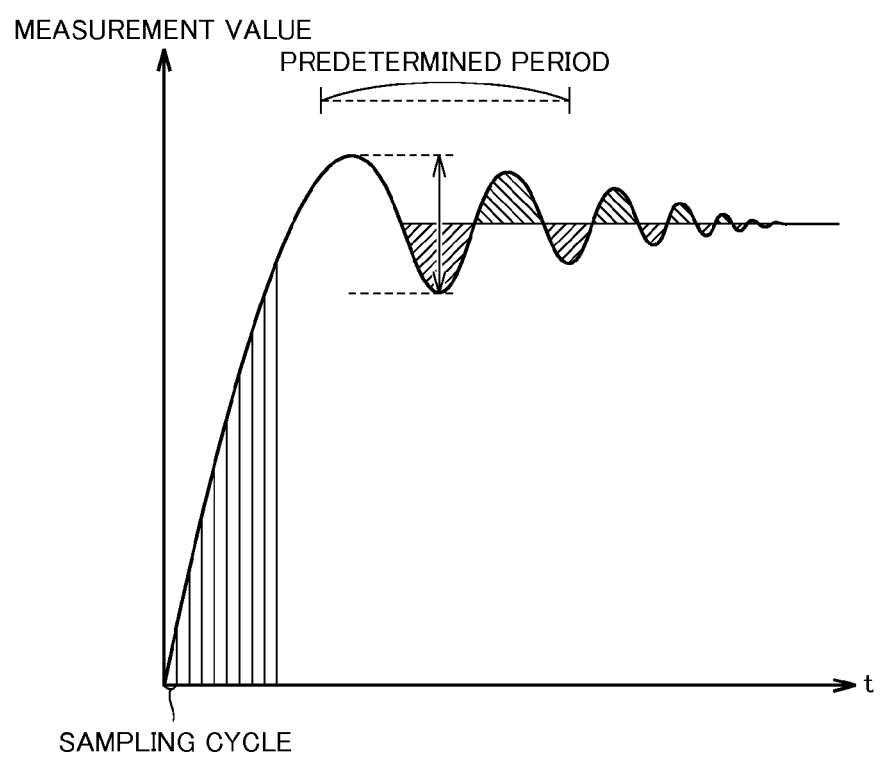
FIG. 7 shows the exemplary illustrative non-limiting graph representing calculation of an average value according to a determination process 1 of the exemplary embodiment.

FIG. 7 represents calculation of an average value based on a determination process 1 of the present embodiment.

Referring to FIG. 7, in determination process 1 of the present embodiment, as a predetermined condition, it is determined whether or not a difference between a maximum value and a minimum value of detected measurement data for a predetermined period falls within a predetermined range.

When determined that the difference between the maximum value and the minimum value of the measurement data detected for the predetermined period falls within the predetermined range, it can be determined that the vibration state is attenuated and the stable state is present.

Thus, when determined that the predetermined condition is satisfied, body weight is measured by calculating an average value of the measurement data for a subsequent predetermined interval.

(Determination Process 2)

Figure 8:
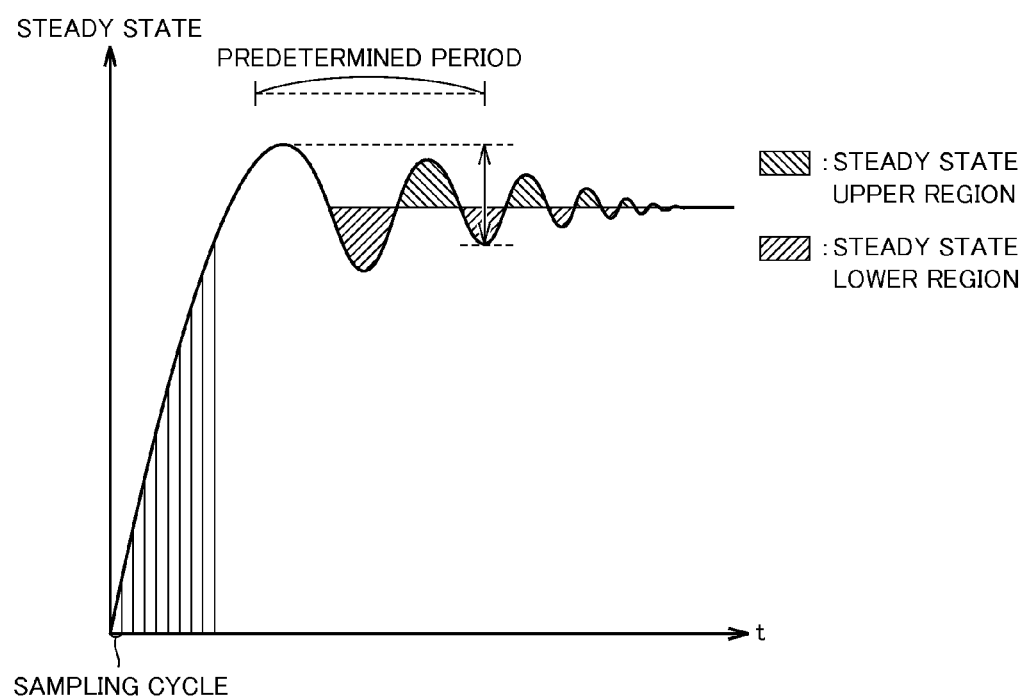
FIG. 8 shows the exemplary illustrative non-limiting graph representing calculation of an average value according to a determination process 2 of the exemplary embodiment.

FIG. 8 represents calculation of the average value based on a determination process 2 of the present embodiment.

Referring to FIG. 8, in determination process 2 of the present embodiment, as a predetermined condition, it is determined whether or not a difference between a maximum value and a current value of the measurement data detected for a predetermined period falls within a predetermined range.

When determined that the difference between the maximum value and the current value of the measurement data detected for the predetermined period falls within a predetermined range, it can be determined that the vibration state is attenuated and the stable state is present.

Thus, when determined that the predetermined condition is satisfied, body weight is measured by calculating an average value of the measurement data for a subsequent predetermined interval.

(Determination Process 3)

Figure 9:
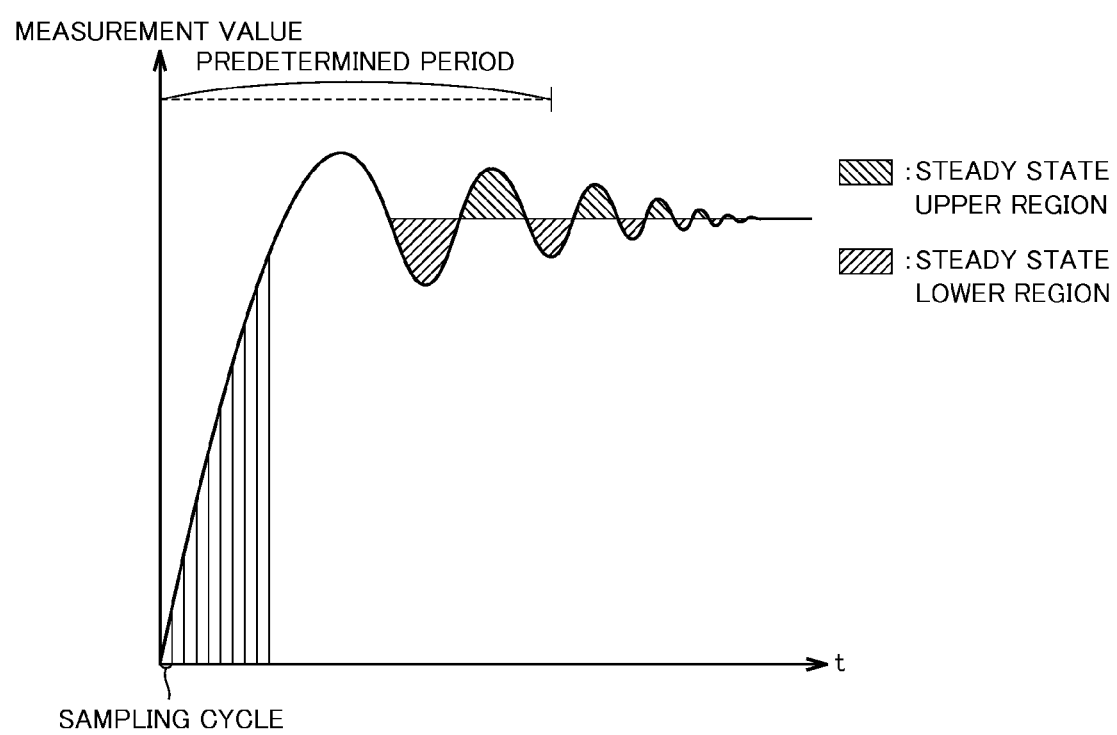
FIG. 9 shows the exemplary illustrative non-limiting graph representing calculation of an average value according to a determination process 3 of the exemplary embodiment.

FIG. 9 represents calculation of an average value based on a determination process 3 of the present embodiment.

Referring to FIG. 9, in determination process 3 of the present embodiment, as a predetermined condition, it is determined whether or not a certain period (predetermined period) has passed after starting detection of the measurement data.

Since it is likely that the vibration state of the transient signal waveform is attenuated after a certain period has passed, it can be determined that the stable state is present.

Thus, when determined that the predetermined condition is satisfied, the body weight is measured by calculating an average value of the measurement data for subsequent predetermined interval.

(Exceptional Process)

In the description above, it is described that the average value is calculated based on measurement data for subsequent predetermined interval when determined that the transient signal waveform is in the stable state. However, the subsequent measurement data possibly includes inappropriate measurement data due to influence of disturbance.

Thus, for calculation of the average value, values deviating from a predetermined range may be excluded from the measured data, so that an average value may be calculated based on the remaining measurement data.

As to the values deviating from the predetermined range, the measurement data of the range beyond the fixed predetermined range may be excluded. Alternatively, the measurement data deviating from the statistically aggregated distribution may be excluded after determining the distribution of the measurement data.

Figure 10:
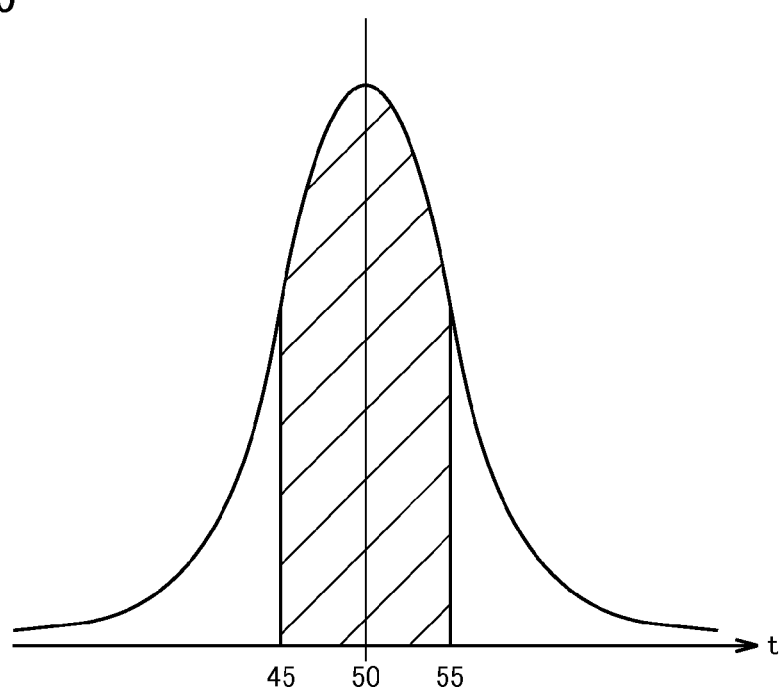
FIG. 10 shows the exemplary illustrative non-limiting graph representing distribution of measurement data for the case where deviation values of measurement data are calculated according to the exemplary embodiment.

FIG. 10 represents distribution of measurement data for the case where deviation value of the measurement data of the present embodiment is calculated.

Referring to FIG. 10, as to the measured measurement data, as one example of determining distribution, deviation values are calculated, and measurement values having the calculated deviation values deviating from the predetermined range are excluded. In the present example, as one example, the predetermined range is set to be the range of deviation values 45-55.

After excluding the measurement data not included in the range, an average value is calculated based on the measured measurement data included in the range.

Accordingly, the measurement values deviating from the predetermined range, in other words, prominent measurement data is excluded, and an average value is calculated based on appropriate measurement data, so that body weight measurement with high accuracy is possible.

(Termination Process)

Figure 11:
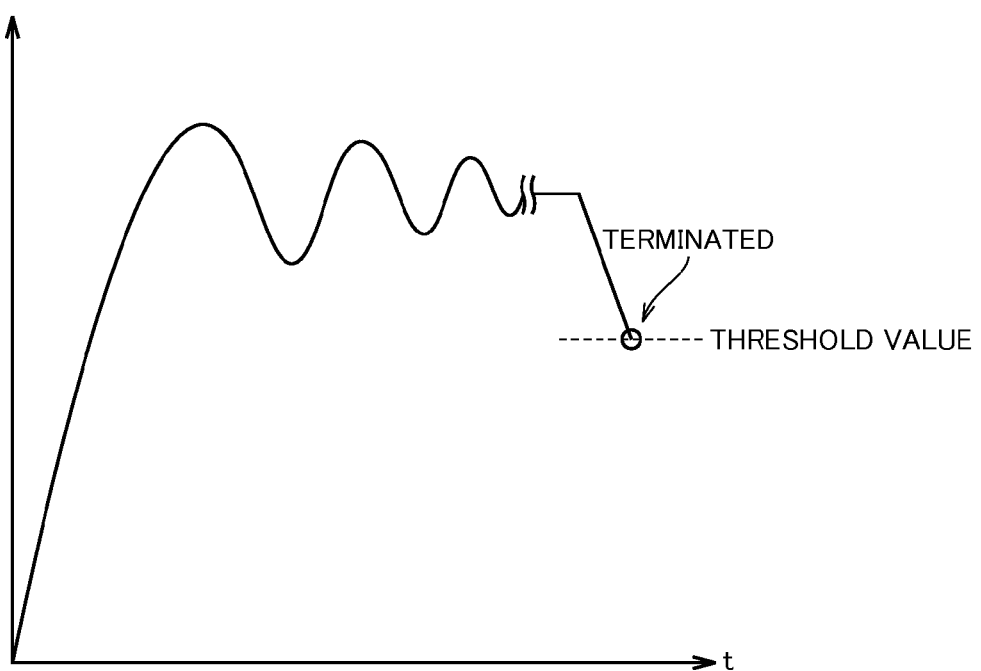
FIG. 11 shows the exemplary illustrative non-limiting graph representing termination of the body weight measurement process according to the exemplary embodiment.

FIG. 11 represents termination of the body weight measurement process based on the present embodiment.

Referring to FIG. 11, as to the termination of the body weight measurement process based on the present embodiment, the measurement is terminated when the measurement data has a value less than or equal to a threshold value. The threshold value may be fixed, or may have a value with a predetermined value reduced from the calculated average value.

For example, when a measured person as a measured object steps away from weight detection unit 36, the measurement data becomes less than or equal to the threshold value, so that it can be determined as the termination of the body weight measurement process.

With this process, information processing device 10 can determine the termination without instruction from weight detection unit 36. Further, the termination process can be executed promptly.

Other Embodiment

In the description above, 60 times/second (60 Hz) is described as cycle information of the weight detection timing. However, the cycle information is not limited to this value. As long as it is a detection cycle allowing the transient signal waveform to be acquired, in other words, it is a sampling frequency, a person skilled in the art can change it to an appropriate value as needed. For example, 10 times/second (10 Hz) can be set as cycle information. In other words, it is possible to have the detection cycle of substantially less than or equal to 100 msec (including the case having a value longer than 100 msec). The value is one example, and the sampling cycle can be set to have a longer detection cycle than 100 msec in accordance with a frequency of the predicted transient signal waveform.

In the present example, as one example, the case of measuring the body weight based on the sum value of four weight detection values detected by four weight sensors 36b provided respectively at four legs of weight detection unit 36 is described. Not limited to this configuration, for example, one weight sensor 36b may be provided to one leg to measure the body weight based on the weight detection value, and a person skilled in the art can change the number to any number as needed.

Further, in the present embodiment, the case is described where the program for executing the process of measuring the body weight is stored in HDD 14 as one example. However, the program may be supplied to HDD 14 from any recording medium, or may be supplied to HDD 14 through wireless communication module 18 or a wired communication line. Further, the function of the program may be achieved only by hardware.

In the present example, the configuration having information processing device 10 and weight detection unit 36 as separate bodies is described. However, not limited to this configuration, information processing device 10 and weight detection unit 36 may be provided as a single measurement device. In such case, there is no need to provide wireless communication module 18, 106, and it may be so configured that only one of CPU 12 and microcomputer 100 is provided, so that one of these execute the process described above.

The configuration having each part of information processing device 10 being integrated is described. However, not limited to the integrated state, it may have a configuration that a part of information processing device 10 may be provided separately. For example, a measurement system may be surely achieved with an input device or a measurement system formed as a separate body.

Further, application executable with a personal computer may be provided as the program of the present embodiment. In this case, the program according to the present embodiment may be incorporated as a part of a function of various applications executed on a personal computer.

The case where the measurement system of the present example measures body weight of a measured person. However, not limited to a person, body weight of an animal or the like can also be measured.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A measurement system measuring body weight, comprising:
    a weight detection device configured to detect weight at predetermined detection cycles; and
    processing circuitry configured to calculate an average value based on measurement values detected at said detection cycles by said weight detection device during a predetermined interval,
    said detection cycle is shorter than a cycle at which a transient signal waveform predicted in accordance with measurement values detected by said weight detection device can be obtained,
    said processing circuitry determines whether or not the measurement values detected by said weight detection device satisfy a predetermined condition, and
    said processing circuitry calculates the average value based on the measurement values for said predetermined interval when determined that the predetermined condition is satisfied.

2. The measurement system according to claim 1, wherein
    said processing circuitry determines whether or not the measurement values detected by said weight detection device for a predetermined period satisfy a predetermined condition, and
    said predetermined interval includes said predetermined period determined that said predetermined condition is satisfied.

3. The measurement system according to claim 1, wherein
    said predetermined interval corresponds to a period subsequent to the determination that said predetermined condition is satisfied.

4. The measurement system according to claim 1, wherein
    said processing circuitry determines whether or not the measurement values detected by said weight detection device is in a stable state, and
    said processing circuitry calculates the average value based on the measurement values for said predetermined interval when determined that detected measurement values are in the stable state.

5. The measurement system according to claim 4, wherein
    said processing circuitry determines whether or not a difference between a maximum value and a minimum value of the measurement values detected by said weight detection device for a predetermined period falls within a predetermined range, and
    said processing circuitry calculates the average value based on the measurement values for said predetermined interval when determined that the difference falls within the predetermined range.

6. The measurement system according to claim 4, wherein
    said processing circuitry determines whether or not a difference between a maximum value and a current value of the measurement values detected by said weight detection device for a predetermined period falls within a predetermined range, and
    said processing circuitry calculates the average value based on the measurement values for said predetermined interval when determined that the difference falls within the predetermined range.

7. The measurement system according to claim 4, wherein
    said processing circuitry determines whether or not a predetermined period has passed after the measurement values are detected by said weight detection device, and
    said processing circuitry calculates the average value based on the measurement values for said predetermined interval when determined that the predetermined period has passed.

8. The measurement system according to claim 1, wherein
    said processing circuitry calculates the average value based on the measurement values detected by said weight detection device, excluding a value deviating from a predetermined range.

9. The measurement system according to claim 8, wherein
    said processing circuitry excludes the value deviating from said predetermined range based on distribution of the measurement values detected by said weight detection device.

10. The measurement system according to claim 9, wherein
    said processing circuitry calculates deviation values of the measurement values detected by said weight detection device, and calculates the average value based on the measurement values detected by said weight detection device, excluding the measurement values having calculated deviation values deviating from the predetermined range.

11. The measurement system according to claim 1, wherein
    said processing circuitry determines whether or not a measurement value detected by said weight detection device is less than or equal to a predetermined value, and
    said processing circuitry terminates calculation of the average value when determined that the measurement value is less than or equal to the predetermined value.

12. The measurement system according to claim 1, wherein said detection cycle is substantially less than or equal to 100 ms.

13. A measurement method implemented using a measurement system configured to measure body weight, the method comprising:
    detecting weight, via a weight detection device, at predetermined detection cycles; and
    calculating, via processing circuitry, an average value based on measurement values detected at said detection cycles by said weight detection device during a predetermined interval,
    said detection cycle being shorter than a cycle at which a transient signal waveform predicted in accordance with detected measurement values can be obtained, said processing circuitry determines whether or not the measurement values detected by said weight detection device satisfy a predetermined condition, and said processing circuitry calculates the average value based on the measurement values for said predetermined interval when determined that the predetermined condition is satisfied.

14. A measurement device measuring body weight, the measurement device operatively coupled to a weight detection device configured to detect weight at predetermined detection cycles, the measurement device comprising:

processing circuitry configured to calculate an average value based on measurement values detected at said detection cycles by said weight detection device during a predetermined interval, said detection cycle being shorter than a cycle at which a transient signal waveform predicted in accordance with measurement values detected by said weight detection device can be obtained, said processing circuitry determines whether or not the measurement values detected by said weight detection device satisfy a predetermined condition, and said processing circuitry calculates the average value based on the measurement values for said predetermined interval when determined that the predetermined condition is satisfied.

15. A non-transitory storage medium comprising a computer readable control program executable by a computer of a measurement device measuring body weight, said control program controls said computer to:

detect weight, via a weight detection device, at predetermined detection cycles; and calculate, via processing circuitry, an average value based on measurement values detected at said detection cycles during a predetermined interval, said detection cycle being shorter than a cycle at which a transient signal waveform predicted in accordance with detected measurement values can be obtained, said processing circuitry determines whether or not the measurement values detected by said weight detection device satisfy a predetermined condition, and said processing circuitry calculates the average value based on the measurement values for said predetermined interval when determined that the predetermined condition is satisfied.

16. A measurement system measuring body weight, comprising:

a weight detection device configured to detect weight at predetermined detection cycles; and processing circuitry configured to calculate an average value based on measurement values detected at said detection cycles by said weight detection device, said processing circuitry determines whether or not the measurement values detected by said weight detection device satisfy a predetermined condition and calculates the average value based on the measurement values when determined that the predetermined condition is satisfied, said processing circuitry further determines whether or not a measurement value detected by said weight detection device is less than or equal to a predetermined value, and said processing circuitry terminates calculation of the average value when determined that the measurement value is less than or equal to the predetermined value.

17. The measurement system according to claim 16, wherein said detection cycle is shorter than a cycle at which a transient signal waveform predicted in accordance with measurement values detected by said weight detection device can be obtained.

18. A measurement method implemented using a measurement system configured to measure body weight, the method comprising:

detecting weight, via a weight detection device, at predetermined detection cycles;

calculating, via processing circuitry, an average value based on measurement values detected at said detection cycles by said weight detection device;

determining whether or not a measurement value detected by said weight detection device is less than or equal to a predetermined value; and terminating calculation of the average value when determined that the measurement value is less than or equal to the predetermined value, said processing circuitry determines whether or not the measurement values detected by said weight detection device satisfy a predetermined condition and calculates the average value based on the measurement values when determined that the predetermined condition is satisfied.

19. A measurement device measuring body weight, the measurement device operatively coupled to a weight detection device configured to detect weight at predetermined detection cycles, the measurement device comprising:

processing circuitry configured to calculate an average value based on measurement values detected at said detection cycles by said weight detection device, said processing circuitry determines whether or not the measurement values detected by said weight detection device satisfy a predetermined condition and calculates the average value based on the measurement values when determined that the predetermined condition is satisfied, said processing circuitry further determines whether or not a measurement value detected by said weight detection device is less than or equal to a predetermined value, and said processing circuitry terminates calculation of the average value when determined that the measurement value is less than or equal to the predetermined value.

20. A non-transitory storage medium comprising a computer readable control program executable by a computer of a measurement device measuring body weight, said control program controls said computer to:

detect weight, via a weight detection device, at predetermined detection cycles;

calculate, via processing circuitry, an average value based on measurement values detected at said detection cycles;

determine whether or not a measurement value is less than or equal to a predetermined value; and terminate calculation of the average value when determined that the measurement value is less than or equal to the predetermined value, said processing circuitry determines whether or not the measurement values detected by said weight detection device satisfy a predetermined condition and calculates the average value based on the measurement values when determined that the predetermined condition is satisfied.

* * * * *